United States Patent [19]
Gan et al.

[11] Patent Number: 6,136,477
[45] Date of Patent: Oct. 24, 2000

[54] NITRATE ADDITIVES FOR NONAQUEOUS ELECTROLYTE RECHARGEABLE CELLS

[75] Inventors: Hong Gan; Esther S. Takeuchi, both of East Amherst, N.Y.

[73] Assignee: Wilson Greatbatch Ltd., Clarence, N.Y.

[21] Appl. No.: 09/320,633

[22] Filed: May 26, 1999

Related U.S. Application Data

[60] Provisional application No. 60/105,278, Oct. 22, 1998.

[51] Int. Cl.⁷ ....................................................... H01M 6/18
[52] U.S. Cl. ........................... 429/307; 429/323; 429/330; 429/332; 429/338; 429/342; 429/218.1; 429/231.1; 429/231.2; 429/231.3; 429/231.8; 429/231.95
[58] Field of Search .................................. 429/307, 323, 429/330, 332, 338, 342, 218.1, 231.8, 231.1, 231.2, 231.3, 231.95

[56] References Cited

U.S. PATENT DOCUMENTS

| | | | |
|---|---|---|---|
| 2,583,589 | 1/1952 | O'Connor | 136/100 |
| 3,489,611 | 1/1970 | Braeuer | 136/6 |
| 4,060,674 | 11/1977 | Klemann et al. | 429/194 |
| 4,132,837 | 1/1979 | Soffer | 429/194 |
| 4,264,689 | 4/1981 | Moses | 429/194 |
| 4,654,278 | 3/1987 | McManis, III et al. | 429/112 |
| 4,786,567 | 11/1988 | Skyllas-Kazacos et al. | 429/19 |
| 5,112,704 | 5/1992 | Furukawa et al. | 429/194 |
| 5,658,688 | 8/1997 | Jolson | 429/194 |
| 5,691,083 | 11/1997 | Bolster | 429/194 |

FOREIGN PATENT DOCUMENTS

| | | |
|---|---|---|
| 5101846 | 4/1993 | European Pat. Off. . |
| 0829911A2 | 3/1998 | European Pat. Off. . |
| 2086644A | 5/1982 | United Kingdom . |

OTHER PUBLICATIONS

Simon et al., "Electrochemical study of the passivating layer on lithium intercalated carbon electrodes in nonaqueous solvents," Journal of Power Sources, 43–44 (1993), pp. 65–74.

Patent Abstracts of Japan, Publication No. 58214281, dated Dec. 13, 1983, title: Nonaqueous Electrolyte For Lithium Secondary Battery.

Patent Abstracts of Japan, Publication No. 07022068, dated Jan. 24, 1995, title: Secondary Battery Having Nonaqueous Solvent Electrolyte.

*Primary Examiner*—Laura Weiner
*Attorney, Agent, or Firm*—Hodgson Russ Andrews Woods & Goodyear LLP

[57] ABSTRACT

A lithium ion electrochemical cell having high charge/discharge capacity, long cycle life and exhibiting a reduced first cycle irreversible capacity, is described. The stated benefits are realized by the addition of at least one nitrate additive to an electrolyte comprising an alkali metal salt dissolved in a solvent mixture that includes ethylene carbonate, dimethyl carbonate, ethylmethyl carbonate and diethyl carbonate. The preferred additive is an organic alkyl nitrate compound.

61 Claims, 1 Drawing Sheet

NITRATE ADDITIVES FOR NONAQUEOUS ELECTROLYTE RECHARGEABLE CELLS

CROSS-REFERENCE TO RELATED APPLICATION

The present application claims priority based on U.S. provisional application Ser. No. 60/105,278, filed Oct. 22, 1998.

BACKGROUND OF INVENTION

The present invention generally relates to an alkali metal electrochemical cell, and more particularly, to a rechargeable alkali metal cell. Still more particularly, the present invention relates to a lithium ion electrochemical cell activated with an electrolyte having an additive provided to achieve high charge/discharge capacity, long cycle life and to minimize the first cycle irreversible capacity. According to the present invention, the preferred additive to the activating electrolyte is a nitrate compound.

Alkali metal rechargeable cells typically comprise a carbonaceous anode electrode and a lithiated cathode electrode. Due to the high potential of the cathode material (up to 4.3V vs.

Li/Li$^+$ for Li$_{1-x}$CoO$_2$) and the low potential of the carbonaceous anode material (0.01V vs. Li/Li$^+$ for graphite) in a fully charged lithium ion cell, the choice of the electrolyte solvent system is limited. Since carbonate solvents have high oxidative stability toward typically used lithiated cathode materials and good kinetic stability toward carbonaceous anode materials, they are generally used in lithium ion cell electrolytes. To achieve optimum cell performance (high rate capability and long cycle life), solvent systems containing a mixture of a cyclic carbonate (high dielectric constant solvent) and a linear carbonate (low viscosity solvent) are typically used in commercial secondary cells. Cells with carbonate based electrolytes are known to deliver more than 1000 charge/discharge cycles at room temperature.

U.S. patent application Ser. No. 09/133,799 pending, which is assigned to the assignee of the present invention and incorporated herein by reference, is directed to a quaternary mixture of organic carbonate solvents in the activating electrolyte for a lithium ion cell capable of discharge at temperatures below −20° C. and down to as low as −40° C. while exhibiting good cycling characteristics. The quaternary solvent system includes ethylene carbonate (EC), dimethyl carbonate (DMC), ethylmethyl carbonate (EMC) and diethyl carbonate (DEC).

Lithium ion cell design generally involves a trade off in one area for a necessary improvement in another, depending on the targeted cell application. The achievement of a lithium-ion cell capable of low temperature cycleability by use of the above quaternary solvent electrolyte, in place of a typically used binary solvent electrolyte (such as 1.0M LiPF$_6$/EC:DMC=30:70, v/v which freezes at −11° C.), is obtained at the expense of increased first cycle irreversible capacity during the initial charging (approximately 65 mAh/g graphite for 1.0M LiPF$_6$/EC:DMC:EMC:DEC=45:22:24.8:8.2 vs. 35 mAh/g graphite for 1.0M LiPF$_6$/EC:DMC=30:70). Due to the existence of this first cycle irreversible capacity, lithium ion cells are generally cathode limited. Since all of the lithium ions, which shuttle between the anode and the cathode during charging and discharging originally come from the lithiated cathode, the larger the first cycle irreversible capacity, the lower the cell capacity in subsequent cycles and the lower the cell efficiency. Thus, it is desirable to minimize or even eliminate the first cycle irreversible capacity in lithium ion cells while at the same time maintaining the low temperature cycling capability of such cells.

According to the present invention, these objectives are achieved by providing an organic nitrate in the quaternary solvent electrolyte. Lithium ion cells activated with these electrolytes exhibit lower first cycle irreversible capacities relative to cells activated with the same quaternary solvent electrolyte devoid of the nitrate additive. As a result, cells including the nitrate additive present higher subsequent cycling capacity than control cells. The cycleability of the present invention cells at room temperature, as well as at low temperatures, i.e., down to about −40° C., is as good as cells activated with the quaternary electrolyte devoid of a nitrate additive.

SUMMARY OF THE INVENTION

It is commonly known that when an electrical potential is initially applied to lithium ion cells constructed with a carbon anode in a discharged condition to charge the cell, some permanent capacity loss occurs due to the anode surface passivation film formation. This permanent capacity loss is called first cycle irreversible capacity. The film formation process, however, is highly dependent on the reactivity of the electrolyte components at the cell charging potentials. The electrochemical properties of the passivation film are also dependent on the chemical composition of the surface film.

The formation of a surface film is unavoidable for alkali metal systems, and in particular, lithium metal anodes, and lithium intercalated carbon anodes due to the relatively low potential and high reactivity of lithium toward organic electrolytes. The ideal surface film, known as the solid-electrolyte interphase (SEI), should be electrically insulating and ionically conducting. While most alkali metal, and in particular, lithium electrochemical systems meet the first requirement, the second requirement is difficult to achieve. The resistance of these films is not negligible, and as a result, impedance builds up inside the cell due to this surface layer formation which induces unacceptable polarization during the charge and discharge of the lithium ion cell. On the other hand, if the SEI film is electrically conductive, the electrolyte decomposition reaction on the anode surface does not stop due to the low potential of the lithiated carbon electrode.

Hence, the composition of the electrolyte has a significant influence on the discharge efficiency of alkali metal systems, and particularly the permanent capacity loss in secondary cells. For example, when 1.0M LiPF$_6$/EC:DMC=30:70 is used to activate a secondary cell, the first cycle irreversible capacity is approximately 35 mAh/g of graphite. However, under the same cycling conditions, the first cycle irreversible capacity is found to be approximately 65 mAh/g of graphite when 1.0M LiPF$_6$/EC:DMC:EMC:DEC=45:22:24.8:8.2 is used as the electrolyte. Further, lithium ion cells activated with the binary solvent electrolyte of ethylene carbonate and dimethyl carbonate cannot be cycled at temperatures less than about −11° C. The quaternary solvent electrolyte of the previously referenced patent application, which enables lithium ion cells to cycle at much lower temperatures, is a compromise in terms of providing a wider temperature application with acceptable cycling efficiencies. It would be highly desirable to retain the benefits of a lithium ion cell capable of operating at temperatures down to as low as about −40° C. while minimizing the first cycle irreversible capacity.

According to the present invention, this objective is achieved by adding a nitrate additive in the above described quaternary solvent electrolytes. In addition, this invention may be generalized to other nonaqueous organic electrolyte systems, such as binary solvent and ternary solvent systems, as well as the electrolyte systems containing solvents other than mixtures of linear or cyclic carbonates. For example, linear or cyclic ethers or esters may also be included as electrolyte components. Although the exact reason for the observed improvement is not clear, it is hypothesized that the nitrate additive competes with the existing electrolyte components to react on the carbon anode surface during initial lithiation to form a beneficial SEI film. The thusly formed SEI film is electrically more insulating than the film formed without the nitrate additive and, as a consequence, the lithiated carbon electrode is better protected from reactions with other electrolyte components. Therefore, lower first cycle irreversible capacity is obtained.

These and other objects of the present invention will become increasingly more apparent to those skilled in the art by reference to the following description and to the appended drawings.

DETAILED DESCRIPTION OF THE PREFERRED EMBODIMENTS

Figure 1:
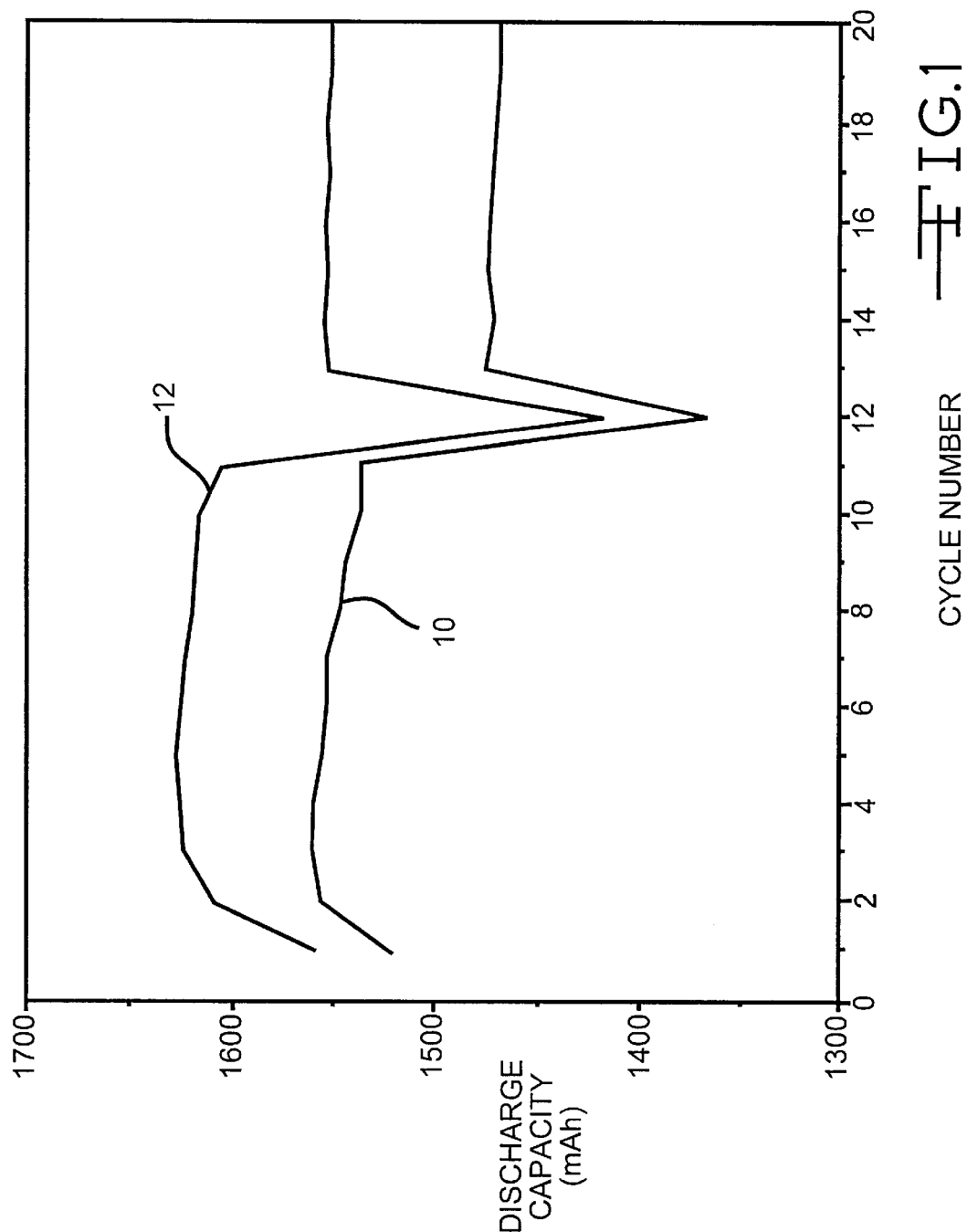
FIG. 1 is a graph showing the averaged discharge capacity through twenty cycles for two groups of lithium-ion cells, one group activated with a quaternary carbonate solvent mixture devoid of a nitrate additive in comparison to a similarly constructed cell group having the nitrate electrolyte additive.

A secondary electrochemical cell constructed according to the present invention includes an anode active material selected from Groups IA, IIA, or IIIB of the Periodic Table of Elements, including the alkali metals lithium, sodium, potassium, etc. The preferred anode active material comprises lithium.

In secondary electrochemical systems, the anode electrode comprises a material capable of intercalating and de-intercalating the alkali metal, and preferably lithium. A carbonaceous anode comprising any of the various forms of carbon (e.g., coke, graphite, acetylene black, carbon black, glassy carbon, etc.) which are capable of reversibly retaining the lithium species, is preferred. Graphite is particularly preferred due to its relatively high lithium-retention capacity. Regardless of the form of the carbon, fibers of the carbonaceous material are particularly advantageous because the fibers have excellent mechanical properties which permit them to be fabricated into rigid electrodes that are capable of withstanding degradation during repeated charge/discharge cycling. Moreover, the high surface area of carbon fibers allows for rapid charge/discharge rates. A preferred carbonaceous material for the anode of a secondary electrochemical cell is described in U.S. Pat. No. 5,443,928 to Takeuchi et al., which is assigned to the assignee of the present invention and incorporated herein by reference.

A typical secondary cell anode is fabricated by mixing about 90 to 97 weight percent graphite with about 3 to 10 weight percent of a binder material which is preferably a fluoro-resin powder such as polytetrafluoroethylene (PTFE), polyvinylidene fluoride (PVDF), polyethylenetetrafluoroethylene (ETFE), polyamides and polyimides, and mixtures thereof. This electrode active admixture is provided on a current collector such as of a nickel, stainless steel, or copper foil or screen by casting, pressing, rolling or otherwise contacting the active admixture thereto.

The anode component further has an extended tab or lead of the same material as the anode current collector, i.e., preferably nickel, integrally formed therewith such as by welding and contacted by a weld to a cell case of conductive metal in a case-negative electrical configuration. Alternatively, the carbonaceous anode may be formed in some other geometry, such as a bobbin shape, cylinder or pellet to allow an alternate low surface cell design.

The cathode of a secondary cell preferably comprises a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

Before fabrication into an electrode for incorporation into an electrochemical cell, the lithiated active material is preferably mixed with a conductive additive. Suitable conductive additives include acetylene black, carbon black and/or graphite. Metals such as nickel, aluminum, titanium and stainless steel in powder form are also useful as conductive diluents when mixed with the above listed active materials. The electrode further comprises a fluoro-resin binder, preferably in a powder form, such as PTFE, PVDF, ETFE, polyamides and polyimides, and mixtures thereof.

To discharge such secondary cells, the lithium ion comprising the cathode is intercalated into the carbonaceous anode by applying an externally generated electrical potential to recharge the cell. The applied recharging electrical potential serves to draw the alkali metal ions from the cathode material, through the electrolyte and into the carbonaceous anode to saturate the carbon comprising the anode. The resulting $Li_xC_6$ electrode can have an x ranging between 0.1 and 1.0. The cell is then provided with an electrical potential and is discharged in a normal manner.

An alternate secondary cell construction comprises intercalating the carbonaceous material with the active alkali material before the anode is incorporated into the cell. In this case, the cathode body can be solid and comprise, but not be limited to, such materials as manganese dioxide, silver vanadium oxide, copper silver vanadium oxide, titanium disulfide, copper oxide, copper sulfide, iron sulfide, iron disulfide and fluorinated carbon. However, this approach is compromised by the problems associated with handling lithiated carbon outside of the cell. Lithiated carbon tends to react when contacted by air.

The secondary cell of the present invention includes a separator to provide physical segregation between the anode and cathode active electrodes. The separator is of an electrically insulative material to prevent an internal electrical short circuit between the electrodes, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. The form of the separator typically is a sheet which is placed between the anode and cathode electrodes. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

Illustrative separator materials include fabrics woven from fluoropolymeric fibers of polyethylenetetrafluoroethylene and polyethylenechlorotrifluoroethylene used either alone or laminated with a fluoropolymeric microporous film. Other suitable separator materials include non-woven glass, polypropylene, polyethylene, glass fiber materials, ceramics, a polytetraflouroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C.H. Dexter, Div., Dexter Corp.).

The choice of an electrolyte solvent system for activating an alkali metal electrochemical cell, and particularly a fully charged lithium ion cell is very limited due to the high potential of the cathode material (up to 4.3V vs. Li/Li$^+$ for Li$_{1-x}$)CoO$_2$) and the low potential of the anode material (0.01V vs.

Li/Li$^+$ for graphite). According to the present invention, suitable nonaqueous electrolytes are comprised of an inorganic salt dissolved in a nonaqueous solvent and more preferably an alkali metal salt dissolved in a quaternary mixture of organic carbonate solvents comprising dialkyl (non-cyclic) carbonates selected from dimethyl carbonate (DMC), diethyl carbonate (DEC), dipropyl carbonate (DPC), ethylmethyl carbonate (EMC), methylpropyl carbonate (MPC) and ethylpropyl carbonate (EPC), and mixtures thereof, and at least one cyclic carbonate selected from propylene carbonate (PC), ethylene carbonate (EC), butylene carbonate (BC) and vinylene carbonate (VC), and mixtures thereof. Organic carbonates are generally used in the electrolyte solvent system for such battery chemistries because they exhibit high oxidative stability toward cathode materials and good kinetic stability toward anode materials.

Preferred electrolytes according to the present invention comprise solvent mixtures of EC:DMC:EMC:DEC. Most preferred volume percent ranges for the various carbonate solvents include EC in the range of about 10% to about 50%; DMC in the range of about 5% to about 75%; EMC in the range of about 5% to about 50%; and DEC in the range of about 3% to about 45%. Electrolytes containing this quaternary carbonate mixture exhibit freezing points below −50° C., and lithium ion cells activated with such mixtures have very good cycling behavior at room temperature as well as very good discharge and charge/discharge cycling behavior at temperatures below −20° C.

Known lithium salts that are useful as a vehicle for transport of alkali metal ions from the anode to the cathode, and back again include LiPF$_6$, LiBF$_4$, LiAsF$_6$, LiSbF$_6$, LiClO$_4$, LiAlCl$_4$, LiGaCl$_4$, LiC(SO$_2$CF$_3$)$_3$, LiNO$_3$, LiN(SO$_2$CF$_3$)$_2$, LiSCN, LIO$_3$SCF$_2$CF$_3$, LiC$_6$F$_5$SO$_3$, LiO$_2$CCF$_3$, LiSO$_3$F, LiB (C$_6$H$_5$)$_4$ and LiCF$_3$SO$_3$, and mixtures thereof. Suitable salt concentrations typically range between about 0.8 to 1.5 molar.

In accordance with the present invention, at least one organic nitrate additive is provided as a co-solvent in the electrolyte solution of the previously described alkali metal ion or rechargeable electrochemical cell. The nitrate additive is preferably an organic alkyl nitrate compound having the general formula (RO)N(=0)$_2$, wherein R is an organic group of either a saturated or unsaturated hydrocarbon or heteroatom substituted saturated or unsaturated organic group containing 1 to 10 carbon atoms. The greatest effect is found when propyl nitrate, isopropyl nitrate, butyl nitrate, isobutyl nitrate, t-butyl nitrate, benzyl nitrate and phenyl nitrate, and mixtures thereof are used as additives in the electrolyte.

The above described compounds are only intended to be exemplary of those that are useful with the present invention, and are not to be construed as limiting. Those skilled in the art will readily recognize nitrate compounds which come under the purview of the general formula set forth above and which will be useful as additives for the electrolyte to achieve high charge/discharge capacity, long cycle life and to minimize the first cycle irreversible capacity according to the present invention.

While not intending to be bound by any particular mechanism, it is believed that due to the presence of the two N=O bonds in the nitrate functional group, [—O—N(=O)$_2$], the bond between oxygen and the R group is severed and the nitrate intermediate is able to compete effectively with the other electrolyte solvents or solutes to react with lithium and form a nitrate salt, i.e., lithium nitrate, or the lithium salt of a nitrate reduction product on the surface of the carbonaceous anode. The resulting SEI layer is electrically less conductive, i.e., no more reduction reactions take place on the anode, than the SEI layer which may form on the anode in the absence of the nitrate additive. As a consequence, the chemical composition and perhaps the morphology of the carbonaceous anode surface protective layer is believed to be changed with concomitant benefits to the cell's cycling characteristics.

The assembly of the cell described herein is preferably in the form of a wound element cell. That is, the fabricated cathode, anode and separator are wound together in a "jellyroll" type configuration or "wound element cell stack" such that the anode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium or aluminum, but not limited thereto, so long as the metallic material is compatible for use with components of the cell.

The cell header comprises a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23 or FUSITE 425 or FUSITE 435. The positive terminal pin feedthrough preferably comprises titanium although molybdenum, aluminum, nickel alloy, or stainless steel can also be used. The cell header comprises elements having compatibility with the other components of the electrochemical cell and is resistant to corrosion. The cathode lead is welded to the positive terminal pin in the glass-to-metal seal and the header is welded to the case containing the electrode stack. The cell is thereafter filled with the electrolyte solution comprising at least one of the nitrate additives described hereinabove and hermetically sealed such as by close-welding a stainless steel ball over the fill hole, but not limited thereto.

The above assembly describes a case-negative cell, which is the preferred construction of the exemplary cell of the present invention. As is well known to those skilled in the art, the exemplary electrochemical system of the present invention can also be constructed in a case-positive configuration.

The following examples describe the manner and process of an electrochemical cell according to the present invention, and set forth the best mode contemplated by the inventors of carrying out the invention, but are not construed as limiting.

EXAMPLE I

Four lithium ion cells were constructed as test vehicles. The cells were divided into two groups of two cells. One group of cells was activated with a quaternary carbonate solvent system electrolyte devoid of a nitrate additive while the remaining cells had the same electrolyte but including the nitrate additive. Except for the electrolyte, the cells were the same. In particular, the cathode was prepared by casting a $LiCoO_2$ cathode mix on aluminum foil. The cathode mix contained 91% $LiCoO_2$, 6% graphite additive and 3% PVDF binder, by weight. The anode was prepared by casting an anode mix containing 91.7% graphite and 8.3% PVDF binder, by weight, on a copper foil. An electrode assembly was constructed by placing one layer of polyethylene separator between the cathode and the anode and spirally winding the electrodes to fit into a prismatic stainless steel can. The cells were activated with an electrolyte of EC:DMC:EMC:DEC=45:22:24.8:8.2 having 1.0M $LIPF_6$ dissolved therein (group 1). The group 2 cells fabricated according to the present invention further had 0.05M isopropyl nitrate (IPN) dissolved therein. Finally, the cells were hermetically sealed.

All four cells were then cycled between 4.1V and 2.75V. The charge cycle was performed under a 300 mA constant current until the cells reach 4.1V. Then, the charge cycle was continued at 4.1V until the current dropped to 60 mA. After resting for 5 minutes, the cells were discharged under a 300 mA constant current to 2.75 V. The cells were rested for another 5 minutes before the next cycle.

The initial average charge and discharge capacities of both groups of cells are summarized in Table 1. The first cycle irreversible capacity was calculated as the difference between the first charge capacity and the first discharge capacity.

TABLE 1

First Cycle Capacities and Irreversible Capacities

| Group | 1st Charge (mAh) | 1st Discharge (mAh) | Irreversible (mAh) |
|---|---|---|---|
| 1 | 1843.4 | 1517.5 | 325.9 |
| 2 | 1808.0 | 1557.2 | 250.8 |

The data in Table 1 clearly demonstrate that both groups of cells had similar first cycle charge capacities. However, the first cycle discharge capacities are quite different. The group 2 cells activated with the electrolyte containing the isopropyl nitrate additive had significantly higher first cycle discharge capacities than that of the group 1 cells (approximately 2.6% higher). As a result, the group 2 cells also had about 23% lower first cycle irreversible capacity than that of the group 1 cells.

EXAMPLE II

After the initial cycle, the cycling of the four cells continued for a total of 10 times under the same cycling conditions as described in Example I. The discharge capacities and the capacity retention of each cycle are summarized in Table 2. The capacity retention is defined as the capacity percentage of each discharge cycle relative to that of the first cycle discharge capacity.

TABLE 2

Cycling Discharge Capacity and Capacity Retention

| | Group 1 | | Group 2 | |
|---|---|---|---|---|
| Cycle # | Capacity (mAh) | Retention (%) | Capacity (mAh) | Retention (%) |
| 1 | 1517.5 | 100.0 | 1557.2 | 100.0 |
| 2 | 1555.4 | 102.5 | 1608.5 | 103.3 |
| 3 | 1557.9 | 102.7 | 1621.8 | 104.1 |
| 4 | 1558.4 | 102.7 | 1624.3 | 104.3 |
| 5 | 1553.5 | 102.4 | 1624.9 | 104.3 |
| 6 | 1551.2 | 102.2 | 1622.8 | 104.2 |
| 7 | 1549.2 | 102.1 | 1621.1 | 104.1 |
| 8 | 1543.8 | 101.7 | 1617.1 | 103.8 |
| 9 | 1540.8 | 101.5 | 1614.9 | 103.7 |
| 10 | 1535.1 | 101.2 | 1612.1 | 103.5 |

The data in Table 2 demonstrate that the group 2 cells with the isopropyl nitrate additive consistently presented higher discharge capacities in all cycles. In addition, this higher capacity was not realized at the expense of lower cycle life. The group 1 and 2 cells had essentially the same cycling capacity retention throughout the various cycles.

While not intending to be bound by any particular theory, it is believed that the increasing capacity and percent retention which was present to the fourth cycle for the group 1 cells and the fifth cycle for the group 2 cells before those readings began decreasing is due to the continuing formation of the electrically less conductive or less reactive SEI layer as a result of cycling. It is believed that the SEI is not completely formed until after the cell has been cycled several times and irreversible capacity does not cease until the SEI layer is completely formed.

EXAMPLE III

After the above cycle testing described in Example II, the cells were charged according to the procedures described in Example I. Then, the cells were discharged under a 3000 mA constant current to 2.75 V then a one minute open circuit rest, followed by a 1500 mA constant current discharge to 2.75 V then a one minute open circuit rest, followed by a 750 mA constant current discharge to 2.75 V then a one minute open circuit rest and, finally, followed by a 300 mA constant current discharge to 2.75 V then a five minute open circuit rest. The averaged total capacities under each discharge rate are summarized in Table 3 and the comparison of averaged discharge efficiency (defined as % capacity of a 300 mA constant current discharge) under the various constant currents are summarized in Table 4. In Table 3, the discharge capacities are cumulative from one discharge current to the next.

TABLE 3

Discharge Capacities (mAh) under Various Currents

| Group | 3000 mA | 1500 mA | 750 mA | 300 mA |
|---|---|---|---|---|
| 1 | 1380.8 | 1497.6 | 1522.1 | 1532.9 |
| 2 | 1429.7 | 1556.3 | 1587.1 | 1601.5 |

TABLE 4

Discharge Efficiency (%) under Various Currents

| Group | 3000 mA | 1500 mA | 750 mA | 300 mA |
|---|---|---|---|---|
| 1 | 90.1 | 97.7 | 99.3 | 100.0 |
| 2 | 89.3 | 97.2 | 99.1 | 100.0 |

The data in Table 3 indicate that the group 2 cells with the isopropyl nitrate additive delivered increased discharge capacity in comparison to the group 1 control cells under all discharge rates tested. The same trends are also shown in Table 4. Under all discharge currents, the group 2 cells presented similar discharge efficiencies to that of the group 1 cells.

EXAMPLE IV

After the above discharge rate capability test, all the cells were fully charged according to the procedure described in Example I. The four test cells were then stored on open circuit voltage (OCV) at 37° C. for two weeks. Finally, the cells were discharged and cycled for eight more times. The % of self-discharge and the capacity retention were calculated and are shown in Table 5.

TABLE 5

Rates of Self-Discharge and After Storage Capacity Retention

| Group | Self-Discharge (%) | Capacity Retention (%) |
|---|---|---|
| 1 | 12.5 | 96.1 |
| 2 | 11.7 | 96.7 |

The data in Table 5 demonstrate that both groups of cells exhibited similar self-discharge rates and similar after storage capacity retention rates. However, since the group 2 cells had higher discharge capacities than that of the group 1 cells, the capacities of the group 2 cells were still higher than that of the group 1 cells, even though they presented similar self-discharge and capacity retention rates. A total of 20 cycles were obtained and the results are summarized in FIG. 1. In particular, curve 10 was constructed from the averaged cycling data of the group 1 cells devoid of the nitrate additive while curve 12 was constructed from the averaged group 2 cells having the electrolyte additives. The increased discharge capacity through the twenty cycles is clearly evident.

In order to generate an ionically more conductive but electrically less conductive or less reactive SEI layer containing the reduction product of a nitrate additive according to the present invention, the reduction reaction of the nitrate additive has to effectively compete with reactions of other electrolyte components on the anode surface. In that regard, the R—O bond in the nitrate additive having the general formula $(RO)N(=O)_2$ has to be weak or reactive. This point has been demonstrated in U.S. patent application Ser. No. 09/112,597, which is assigned to the assignee of the present invention and incorporated herein by reference. In that application it is described that when the nitrate additive has a relatively weak C—O bond, such as isopropyl nitrate (IPN), the beneficial effect is observed for primary lithium/silver vanadium oxide cells in terms of voltage delay reduction and reduced Rdc growth.

Based on similar reasoning, it is believed that the same types of nitrate additives which benefit the discharge performance of a primary lithium electrochemical cell will also benefit first cycle irreversible capacity and cycling efficiency of lithium ion cells due to the formation of a good SEI film on the carbon anode surface. Therefore, for lithium ion cells, the R group in the nitrate additive having the general formula $(RO)N(=O)_2$ is selected from the group consisting of an organic group of either a saturated or unsaturated hydrocarbon or heteratom group containing 1 to 10 carbon atoms.

While not intended to be bound by any particular theory, it is believed that the formation of Li—O—N$(=O)_2$ deposited on the lithiated anode surface is responsible for the improved performance of the lithium-ion cells. If the R group in the nitrate additive is activated (IPN for example), the O—R bond is relatively weak. During reduction, the O—R bond breaks to form a product containing the N—O—Li salt group. This is believed to be the reason for the observed improvements in the lithium ion cells, as shown by those having the IPN additive in the examples.

The concentration limit for the nitrate additive is preferably about 0.001M to about 0.40M. From the previously referenced U.S. Pat. No. 6,060,184 it is described that the concentration limit for the IPN additive is preferably about 0.005M to about 0.01M. Generally, the beneficial effect of the nitrate additive will not be apparent if the additive concentration is less than about 0.001M. On the other hand, if the additive concentration is greater than about 0.40M, the beneficial effect of the additive will be canceled by the detrimental effect of higher internal cell resistance due to the thicker anode surface film formation and lower electrolyte conductivity.

It is appreciated that various modifications to the inventive concepts described herein may be apparent to those of ordinary skill in the art without departing from the spirit and scope of the present invention as defined by the appended claims.

What is claimed is:

1. An electrochemical cell, which comprises:
   a) a negative electrode which intercalates with an alkali metal;
   b) a positive electrode comprising an electrode active material which intercalates with the alkali metal;
   c) a nonaqueous electrolyte activating the negative and the positive electrodes; and
   d) a nitrate additive provided in the electrolyte, wherein the nitrate additive has the formula: $(RO)N(=O)_2$, wherein R is an organic group of either a saturated or unsaturated hydrocarbon or heteroatom group containing 1 to 10 carbon atoms.

2. The electrochemical cell of claim 1 wherein the nitrate additive is selected from the group consisting of propyl nitrate, isopropyl nitrate, butyl nitrate, isobutyl nitrate, t-butyl nitrate, benzyl nitrate and phenyl nitrate, and mixtures thereof.

3. The electrochemical cell of claim 1 wherein the nitrate additive is present in the electrolyte in a range of about 0.001M to about 0.40M.

4. The electrochemical cell of claim 1 wherein the nitrate additive is isopropyl nitrate present in the electrolyte at a concentration up to about 0.05M.

5. The electrochemical cell of claim 1 wherein the electrolyte includes a quaternary, nonaqueous carbonate solvent mixture.

6. The electrochemical cell of claim 1 wherein the electrolyte comprises at least one linear carbonate selected from the group consisting of dimethyl carbonate, diethyl carbonate, dipropyl carbonate, ethylmethyl carbonate, methylpropyl carbonate and ethylpropyl carbonate, and mixtures thereof.

7. The electrochemical cell of claim 6 wherein the electrolyte comprises at least three of the linear carbonates.

8. The electrochemical cell of claim 1 wherein the electrolyte comprises at least one cyclic carbonate selected from the group consisting of ethylene carbonate, propylene carbonate, butylene carbonate and vinylene carbonate, and mixtures thereof.

9. The electrochemical cell of claim 1 wherein the electrolyte comprises ethylene carbonate, dimethyl carbonate, ethylmethyl carbonate and diethyl carbonate.

10. The electrochemical cell of claim 9 wherein the ethylene carbonate is in the range of about 10% to about 50%, the dimethyl carbonate is in the range of about 5% to about 75%, the ethylmethyl carbonate is in the range of about 5% to about 50%, and the diethyl carbonate is in the range of about 3% to about 45%, by volume.

11. The electrochemical cell of claim 1 wherein the electrolyte includes an alkali metal salt selected from the group consisting of $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiB(C_6H_5)_4$ and $LiCF_3SO_3$, and mixtures thereof.

12. The electrochemical cell of claim 11 wherein the alkali metal is lithium.

13. The electrochemical cell of claim 1 wherein the negative electrode comprises a negative electrode active material selected from the group consisting of coke, carbon black, graphite, acetylene black, carbon fibers and glassy carbon, and mixtures thereof.

14. The electrochemical cell of claim 1 wherein the negative electrode active material is mixed with a fluoro-resin binder.

15. The electrochemical cell of claim 1 wherein the positive electrode comprises a positive electrode active material selected from the group consisting of lithiated oxides, lithiated sulfides, lithiated selenides and lithiated tellurides of the group selected from vanadium, titanium, chromium, copper, molybdenum, niobium, iron, nickel, cobalt and manganese, and mixtures thereof.

16. The electrochemical cell of claim 15 wherein the positive electrode active material is mixed with a fluoro-resin binder.

17. The electrochemical cell of claim 15 wherein the positive electrode active material is mixed with a conductive additive selected from the group consisting of acetylene black, carbon black, graphite, nickel powder, aluminum powder, titanium powder and stainless steel powder, and mixtures thereof.

18. An electrochemical cell, which comprises:
a) a negative electrode which intercalates with lithium;
b) a positive electrode comprising an electrode active material and which intercalates with lithium; and
c) an electrolyte solution activating the anode and the cathode, the electrolyte including an alkali metal salt dissolved in a quaternary, nonaqueous carbonate solvent mixture of ethylene carbonate, dimethyl carbonate, ethylmethyl carbonate and diethyl carbonate; and
d) an organic nitrate additive provided in the electrolyte.

19. The electrochemical cell of claim 18 wherein the nitrate additive has the formula: $(RO)N(=O)_2$, wherein R is selected from the group consisting of an organic group of either a saturated or unsaturated hydrocarbon or heteroatom group containing 1 to 10 carbon atoms.

20. The electrochemical cell of claim 18 wherein the nitrate additive is selected from the group consisting of propyl nitrate, isopropyl nitrate, butyl nitrate, isobutyl nitrate, t-butyl nitrate, benzyl nitrate and phenyl nitrate, and mixtures thereof.

21. The electrochemical cell of claim 18 wherein the ethylene carbonate is in the range of about 10% to about 50%, the dimethyl carbonate is in the range of about 5% to about 75%, the ethylmethyl carbonate is in the range of about 5% to about 50%, and the diethyl carbonate is in the range of about 3% to about 45%, by volume.

22. The electrochemical cell of claim 18 wherein the electrolyte includes an alkali metal salt selected from the group consisting of $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, LiSCN, $LiO_3SCF2CF_3$, $LiC_6F_5SO_3$, $LiO_2CCF_3$, $LiSO_3F$, $LiB(C_6H_5)_4$ and $LiCF_3SO_3$, and mixtures thereof.

23. An electrochemical cell, which comprises:
a) an anode comprising an active material capable of intercalating an alkali metal;
b) a solid cathode of electrically conductive material; and
c) a nonaqueous electrolyte activating the anode and the cathode, the nonaqueous electrolyte comprising an organic nitrate additive having the general formula: $(RO)N(=O)_2$, wherein R is selected from the group consisting of an organic group of either a saturated or unsaturated hydrocarbon or heteroatom group containing 1 to 10 carbon atoms.

24. An electrochemical cell, which comprises:
a) an anode of a carbonaceous material capable of intercalating lithium;
b) a cathode comprising lithium cobalt oxide; and
c) a nonaqueous electrolyte activating the anode and the cathode, the nonaqueous electrolyte comprising at least one linear carbonate selected from the group consisting of dimethyl carbonate, diethyl carbonate, dipropyl carbonate, ethylmethyl carbonate, methylpropyl carbonate, ethylpropyl carbonate, and mixtures thereof, and at least one cyclic carbonate selected from the group consisting of ethylene carbonate, propylene carbonate, butylene carbonate, vinvlene carbonate, and mixtures thereof, and an organic nitrate additive that provides lithium nitrate or the lithium salt of a nitrate reduction product on a surface of the lithium intercalated anode in contact with the electrolyte.

25. A method for providing an electrochemical cell, comprising the steps of:
a) providing a negative electrode which intercalates with an alkali metal;
b) providing a positive electrode comprising an electrode active material which intercalates with the alkali metal;
c) activating the negative and positive electrodes with a nonaqueous electrolyte; and
d) providing a nitrate additive in the electrolyte, the nitrate additive having the formula: $(RO)N(=O)_2$, wherein R is an organic group of either a saturated or unsaturated hydrocarbon or heteroatom group containing 1 to 10 carbon atoms.

26. The method of claim 25 including selecting the nitrate additive from the group consisting of propyl nitrate, isopropyl nitrate, butyl nitrate, isobutyl nitrate, t-butyl nitrate, benzyl nitrate and phenyl nitrate, and mixtures thereof.

27. The method of claim 25 including providing the nitrate additive present in the electrolyte in a range of about 0.001M to about 0.40M.

28. The method of claim 25 wherein the nitrate additive is isopropyl nitrate present in the electrolyte at a concentration up to about 0.05M.

29. The method of claim 25 including providing the electrolyte comprising a quaternary, nonaqueous carbonate solvent mixture.

30. The method of claim 25 wherein the electrolyte comprises at least one linear carbonate selected from the group consisting of dimethyl carbonate, diethyl carbonate, dipropyl carbonate, ethylmethyl carbonate, methylpropyl carbonate and ethylpropyl carbonate, and mixtures thereof.

31. The method of claim 30 wherein the electrolyte comprises at least three of the linear carbonates.

32. The method of claim 25 wherein the electrolyte comprises at least one cyclic carbonate selected from the group consisting of ethylene carbonate, propylene carbonate, butylene carbonate and vinylene carbonate, and mixtures thereof.

33. The method of claim 25 wherein the electrolyte comprises ethylene carbonate, dimethyl carbonate, ethylmethyl carbonate and diethyl carbonate.

34. The method of claim 33 wherein the ethylene carbonate is in the range of about 10% to about 50%, the dimethyl carbonate is in the range of about 5% to about 75%, the ethylmethyl carbonate is in the range of about 5% to about 50%, and the diethyl carbonate is in the range of about 3% to about 45%, by volume.

35. The method of claim 25 wherein the electrolyte includes an alkali metal salt selected from the group consisting of $LiPF_6$, $LiBF_4$, $LiAsF_6$, $LiSbF_6$, $LiClO_4$, $LiAlCl_4$, $LiGaCl_4$, $LiNO_2$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$ and $LiCF_3SO_3$, and mixtures thereof.

36. The method of claim 26 wherein the alkali metal is lithium.

37. The method of claim 25 including providing the positive electrode comprising a positive electrode active material selected from the group consisting of lithiated oxides, lithiated sulfides, lithiated selenides and lithiated tellurides of the group selected from vanadium, titanium, chromium, copper, molybdenum, niobium, iron, nickel, cobalt and manganese, and mixtures thereof.

38. The method of claim 25 including providing the negative electrode comprising a negative electrode active material selected from the group consisting of coke, carbon black, graphite, acetylene black, carbon fibers and glassy carbon, and mixtures thereof.

39. An electrochemical cell, which comprises:
  a) a negative electrode which intercalates with an alkali metal;
  b) a positive electrode comprising an electrode active material which intercalates with the alkali metal;
  c) a nonaqueous electrolyte activating the negative and the positive electrodes; and
  d) an organic nitrate additive provided in the electrolyte, wherein the nitrate additive is selected from the group consisting of propyl nitrate, isopropyl nitrate, butyl nitrate, isobutyl nitrate, t-butyl nitrate, benzyl nitrate, phenyl nitrate, and mixtures.

40. The electrochemical cell of claim 39 wherein the nitrate additive is isopropyl nitrate present in the electrolyte at a concentration up to about 0.05M.

41. An electrochemical cell, which comprises:
  a) a negative electrode which intercalates with an alkali metal;
  b) a positive electrode comprising an electrode active material which intercalates with the alkali metal;
  c) a nonaqueous electrolyte including a quaternary, nonaqueous carbonate solvent mixture activating the negative and the positive electrodes; and
  d) an organic nitrate additive provided in the electrolyte.

42. The electrochemical cell of claim 41 wherein the electrolyte comprises at least one linear carbonate selected from the group consisting of dimethyl carbonate, diethyl carbonate, dipropyl carbonate, ethylmethyl carbonate, methylpropyl carbonate, ethylpropyl carbonate, and mixtures thereof.

43. The electrochemical cell of claim 42 wherein the electrolyte comprises at least three of the linear carbonates.

44. The electrochemical cell of claim 41 wherein the electrolyte comprises at least one cyclic carbonate selected from the group consisting of ethylene carbonate, propylene carbonate, butylene carbonate, vinylene carbonate, and mixtures thereof.

45. The electrochemical cell of claim 41 wherein the electrolyte comprises ethylene carbonate, dimethyl carbonate, ethylmethyl carbonate and diethyl carbonate.

46. The electrochemical cell of claim 45 wherein the ethylene carbonate is in the range of about 10% to about 50%, the dimethyl carbonate is in the range of about 5% to about 75%, the ethylmethyl carbonate is in the range of about 5% to about 50%, and the diethyl carbonate is in the range of about 3% to about 45%, by volume.

47. An electrochemical cell, which comprises:
  a) a negative electrode which intercalates with an alkali metal, wherein the negative electrode comprises a negative electrode active material selected from the group consisting of coke, carbon black, graphite, acetylene black, carbon fibers, glassy carbon, and mixtures thereof;
  b) a positive electrode comprising an electrode active material which intercalates with the alkali metal;
  c) a nonaqueous electrolyte activating the negative and the positive electrodes; and
  d) an organic nitrate additive provided in the electrolyte.

48. The electrochemical cell of claim 47 wherein the negative electrode active material is mixed with a fluororesin binder.

49. An electrochemical cell, which comprises:
  a) a negative electrode which intercalates with an alkali metal;
  b) a positive electrode comprising an electrode active material which intercalates with the alkali metal, wherein the positive electrode comprises a positive electrode active material selected from the group consisting of lithiated oxides, lithiated sulfides, lithiated selenides and lithiated tellurides of any of the group selected from vanadium, titanium, chromium, copper, molybdenum, niobium, iron, nickel, cobalt, manganese, and mixtures thereof;
  c) a nonaqueous electrolyte activating the negative and the positive electrodes; and
  d) an organic nitrate additive provided in the electrolyte.

50. The electrochemical cell of claim 49 wherein the positive electrode active material is mixed with a fluororesin binder.

51. The electrochemical cell of claim 49 wherein the positive electrode active material is mixed with a conductive additive selected from the group consisting of acetylene black, carbon black, graphite, nickel powder, aluminum powder, titanium powder, stainless steel powder, and mixtures thereof.

52. A method for providing an electrochemical cell, comprising the steps of:

a) providing a negative electrode which intercalates with an alkali metal;
b) providing a positive electrode comprising an electrode active material which intercalates with the alkali metal;
c) activating the negative and positive electrodes with a nonaqueous electrolyte; and
d) providing an organic nitrate additive in the electrolyte, wherein the nitrate additive is selected from the group consisting of propyl nitrate, isopropyl nitrate, butyl nitrate, isobutyl nitrate, t-butyl nitrate, benzyl nitrate, phenyl nitrate, and mixtures thereof.

53. The method of claim 52 wherein the nitrate additive is isopropyl nitrate present in the electrolyte at a concentration up to about 0.05M.

54. A method for providing an electrochemical cell, comprising the steps of:
a) providing a negative electrode which intercalates with an alkali metal;
b) providing a positive electrode comprising an electrode active material which intercalates with the alkali metal;
c) activating the negative and positive electrodes with a nonaqueous electrolyte including a quaternary, nonaqueous carbonate solvent mixture; and
d) providing an organic nitrate additive in the electrolyte.

55. The method of claim 54 wherein the electrolyte comprises at least one linear carbonate selected from the group consisting of dimethyl carbonate, diethyl carbonate, dipropyl carbonate, ethylmethyl carbonate, methylpropyl carbonate, ethylpropyl carbonate, and mixtures thereof.

56. The method of claim 55 wherein the electrolyte comprises at least three of the linear carbonates.

57. The method of claim 54 wherein the electrolyte comprises at least one cyclic carbonate selected from the group consisting of ethylene carbonate, propylene carbonate, butylene carbonate, vinylene carbonate, and mixtures thereof.

58. The method of claim 54 wherein the electrolyte comprises ethylene carbonate, dimethyl carbonate, ethylmethyl carbonate and diethyl carbonate.

59. The method of claim 58 wherein the ethylene carbonate is in the range of about 10% to about 50%, the dimethyl carbonate is in the range of about 5% to about 75%, the ethylmethyl carbonate is in the range of about 5% to about 50%, and the diethyl carbonate is in the range of about 3% to about 45%, by volume.

60. A method for providing an electrochemical cell, comprising the steps of:
a) providing a negative electrode which intercalates with an alkali metal;
b) providing a positive electrode comprising a positive electrode active material which intercalates with the alkali metal and including selecting the positive electrode active material from the group consisting of lithiated oxides, lithiated sulfides, lithiated selenides and lithiated tellurides of any one of the group selected from vanadium, titanium, chromium, copper, molybdenum, niobium, iron, nickel, cobalt, manganese, and mixtures thereof;
c) activating the negative and positive electrodes with a nonaqueous electrolyte; and
d) providing an organic nitrate additive in the electrolyte.

61. A method for providing an electrochemical cell, comprising the steps of:
a) providing a negative electrode comprising a negative electrode active material which intercalates with an alkali metal and including selecting the negative electrode active material from the group consisting of coke, carbon black, graphite, acetylene black, carbon fibers, glassy carbon, and mixtures thereof;
b) providing a positive electrode comprising an electrode active material which intercalates with the alkali metal;
c) activating the negative and positive electrodes with a nonaqueous electrolyte; and
d) providing an organic nitrate additive in the electrolyte.

* * * * *